United States Patent [19]
DeGroof

[11] Patent Number: 5,598,282
[45] Date of Patent: Jan. 28, 1997

[54] FOLDING STEREOSCOPIC COMPUTER DISPLAY

[75] Inventor: Steven L. DeGroof, Raleigh, N.C.

[73] Assignee: ATI Technologies Inc., Thornhill, Canada

[21] Appl. No.: 323,875

[22] Filed: Oct. 17, 1994

[51] Int. Cl.⁶ .......................... G02F 1/1335; H04N 13/04
[52] U.S. Cl. ................................. 349/15; 348/58
[58] Field of Search ............................. 359/53, 630, 83; 348/51, 58; 345/9

[56] References Cited

U.S. PATENT DOCUMENTS

| | | | |
|---|---|---|---|
| 4,647,966 | 3/1987 | Phillips et al. | 350/331 |
| 5,408,264 | 4/1995 | Kurata et al. | 348/51 |

FOREIGN PATENT DOCUMENTS

| | | |
|---|---|---|
| 63-74027 | 4/1988 | Japan . |
| 63-89820 | 4/1988 | Japan . |

Primary Examiner—William L. Sikes
Assistant Examiner—Charles Miller
Attorney, Agent, or Firm—Pascal & Associates

[57] ABSTRACT

A stereoscopic display is comprised of a pair of display apparatus having faces mutually oriented between approximately 90° and 120° to each other, apparatus for polarizing light from images displayed on the respective display apparatus, light from one image being polarized orthogonally to the light from the other image, a semitransparent mirror disposed between and approximately bisecting the angle between the pair of display apparatus for transmitting light from an image displayed on one display apparatus and reflecting light from an image displayed on the other display apparatus, toward a viewing position.

6 Claims, 3 Drawing Sheets

FOLDING STEREOSCOPIC COMPUTER DISPLAY

FIELD OF THE INVENTION

This invention relates to stereoscopic displays, and in particular to a stereoscopic display which can be incorporated into a portable computer.

BACKGROUND TO THE INVENTION

Display of stereoscopic images has long been known. Two visual images of the same scene are presented to a viewer, but one being at a slightly different viewing angle to the other. Means such as a physical barrier, or polarized or colored glasses cause the different images to be viewed only by corresponding individual eyes. The brain merges these images seen by different eyes into a single three dimensional image having the illusion of depth.

Stereoscopic displays have been provided on computer screens by displaying the two images sequentially on a single display in different colors, the images being separated for presentation to each eye of the user by means of colored filters in glasses worn by the user. Unfortunately since each of the images must be presented in a separate scanning process, the result has been the perception of undesirable flicker.

In addition, the images being required to be presented in separate colors requires the computer displays to be able to present different colors, which is costly since color displays must be used, and substantially eliminates the possibility of presentation of the stereoscopic image to the user using a monochrome display. A large number of portable computers utilize a monochrome display, often for the reason of cost, and therefore this technique cannot be used with inexpensive monochrome displays such as are contained in portable computers.

SUMMARY OF THE INVENTION

The present invention is a stereoscopic display which is suitable for use in portable computers, and uses monochrome displays, although there is no reason why the invention cannot be used with colored displays instead. In the preferred embodiment of the invention the stereoscopic display can be folded flat in the form typical of today's laptop and notebook portable computers, therefore making the display easy to transport and easy to use once unfolded.

In accordance with an embodiment of the present invention, a stereoscopic display is comprised of a pair of displays having faces mutually oriented between approximately 90° and 120° to each other, apparatus for polarizing light from images displayed on the respective display means, light from one image being polarized orthogonally to the light from the other image, a semitransparent mirror disposed between and approximately bisecting the angle between the pair of displays for transmitting light from an image displayed on one display and reflecting light from an image displayed on the other display, toward a viewing position.

In order to have the images correctly oriented when merged, it is preferred to have each of the displays display images oriented in mirror image orientation to the other with respect to said mirror.

In accordance with another embodiment, the displays are LCDs. One edge of each of the LCDs is hinged to the other and to one edge of the mirror. Two pair of mirror alignment arms which are equal in length are used, each pair being slidingly hinged between an edge of the mirror and respective fixed positions at corresponding edges of the LCD, whereby the LCDs may be rotated about the hinge connecting them together from a mutually facing closed position to an open position between 90° and 120° apart while the arms maintain the mirror in a position bisecting the angle between the LCDs.

BRIEF INTRODUCTION TO THE DRAWINGS

A better understanding of the invention will be obtained by reading the description of the invention below, with reference to the following drawings, in which:

FIG. 1 is an illustration of the principles of the invention from one edge of the invention, FIG. 2 is an illustration from the side showing how the images on the displays should be oriented, FIGS. 3A, 3B and 3C are illustrations of the invention from one edge thereof, in closed, 90° and 120° open positions respectively, and FIG. 4 is a detail of an edge of the mirror, showing how it can be retained to mirror alignment arms.

DETAILED DESCRIPTION OF THE INVENTION

Figure 1:
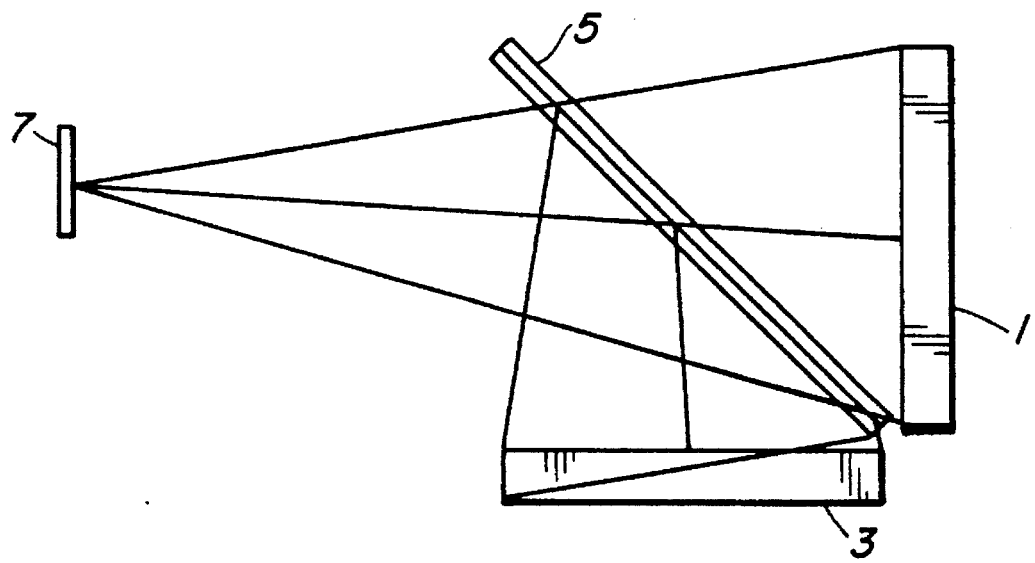

Turning to FIG. 1, a pair of liquid crystal displays (LCDs) 1 and 3 are positioned mutually about 90° to 120° apart. Each display displays one of the stereoscopic images intended for one of the eyes.

A semi-transparent mirror 5 is disposed so that it bisects the angle between the LCDs. The light depicting the image for one eye emitted by one LCD is polarized at 90° to the light depicting the other image for the other eye emitted by the other LCD. For example, the light emitted by LCD 3 is intended for viewing by the right eye of the user, and is horizontally polarized. The light emitted by LCD 1 is intended for viewing by the left eye of the user, and is vertically polarized. The width of the mirror 5 is similar to that of each of the LDCs, or wider.

A user wears a pair of glasses or visor 7 containing lenses or the like having correspondingly polarized filters for allowing only the horizontally polarized light to reach the right eye and only the vertically polarized light to reach the left eye.

As shown by the light ray tracings, vertically polarized light from LCD 1, passes through mirror 5 to the user, and horizontally polarized light from LCD 3 is reflected to the user. The user thus receives the combined, separately polarized images, and distinguishes them to separate eyes by means of the polarizing filters of the glasses or visor.

Figure 2:
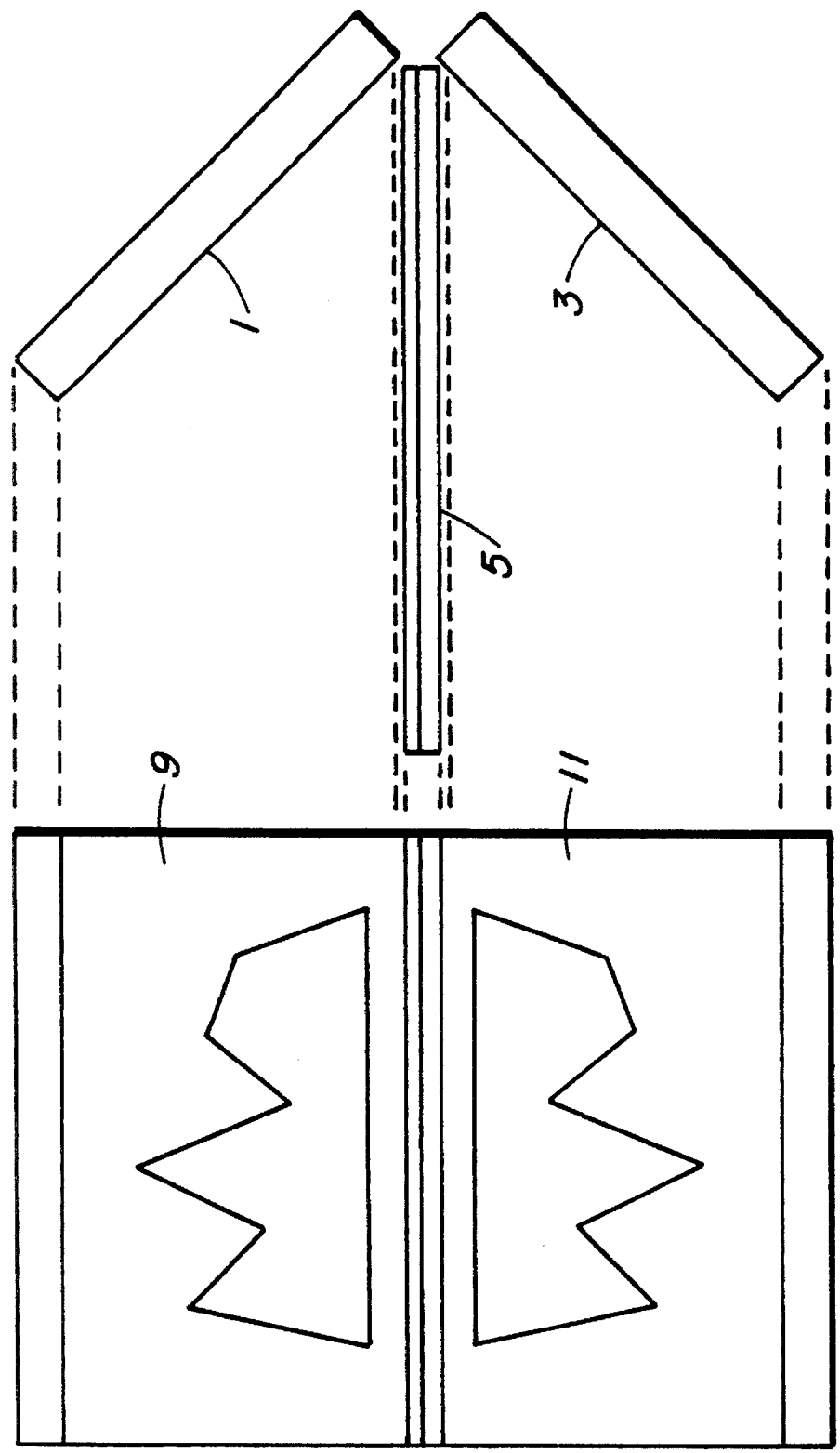

The images 9 and 11 displayed on displays 1 and 3 should be vertically inverted relative to each other, i.e. they are in mirror image to each other with respect to the mirror 5, as shown in FIG. 2, so that when reflected by the mirror, both images are similarly oriented. Thus image 9 created on LCD 1 is to be viewed by the left eye and image 11 created on LCD 3 is to be viewed by the right eye.

Figure 3A:
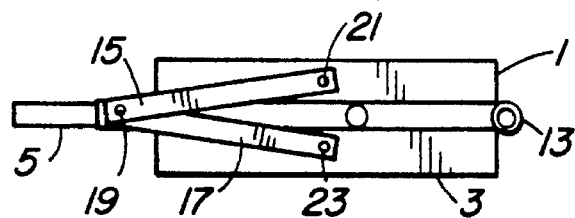
Figure 3B:
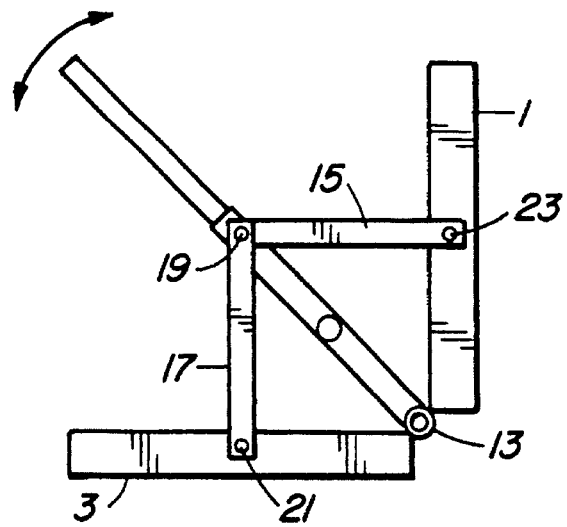
Figure 3C:
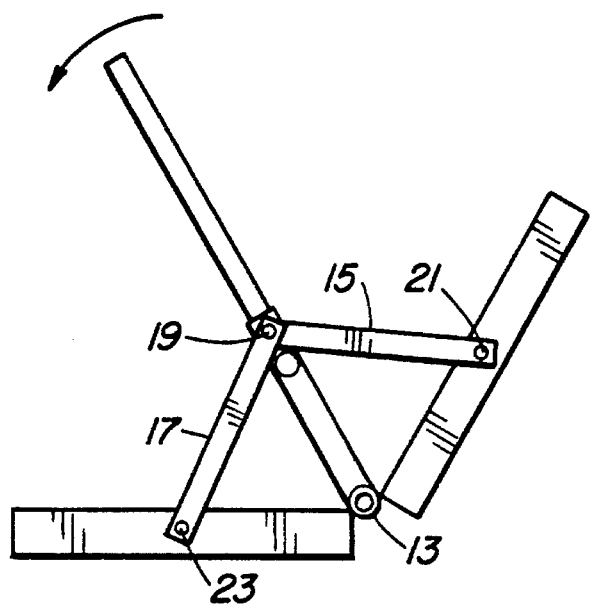

FIGS. 3A, 3B and 3C show the invention at three different positions: closed, open wherein the displays are at a 90° angle to each other, and open wherein the displays are at a 120° angle to each other. In the closed position, the displays are compact enough to be portable, and can be incorporated into a portable computer, for example. For normal viewing, the LCDs are opened to an angle of between 90° and 120°.

In a preferred embodiment of the invention, the LDCs and the mirror 5 are hinged to each other along hinge 13. A pair of mirror alignment arms 15 and 17, which are equal in length to each other, are slidingly hinged to the mirror at sliding hinge point 19. The mirror alignment arms are also respectively hinged to the edges of the LCDs, i.e. arm 15 to LCD 1 at hinge point 23 and arm 17 to LCD 3 at hinge point 21. Corresponding mirror alignment arms are similarly slidingly hinged to the mirror and fixedly to the LCDs at their opposite edges.

In operation, as the display is opened or closed, the sliding hinge point slides along the edge of the mirror, keeping it at the correct angle for aligning the images displayed on the two LCDs.

Figure 4:
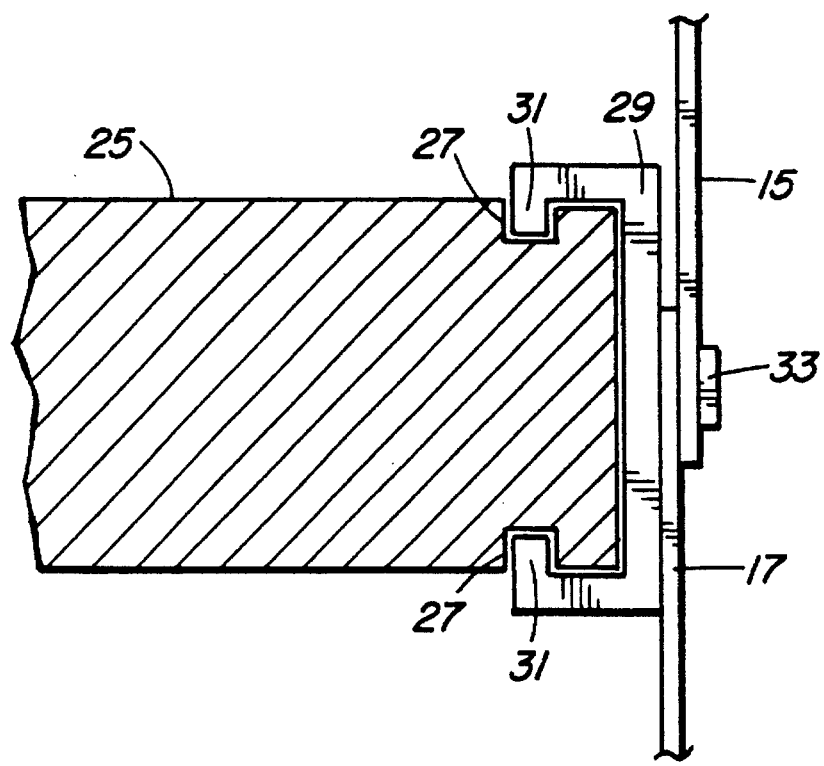

FIG. 4 is an illustration of a detail of the structure including a sliding bracket for creating a sliding hinge point on the mirror, one of each being disposed at each of the opposite edges of the mirror. A crossection of the mirror or a holder for the mirror is shown as reference numeral 25. The mirror or its holder contains channels 27 on opposite faces thereof along and spaced from each edge adjacent arms 15 and 17. A U-shaped bracket 29 containing inwardly facing ends 31 which fit into channels 27 grips the edge of the mirror or its holder. The grip is not so tight as to prohibit the bracket from sliding along the edge of the mirror, but should be snug enough so that the bracket retains its position along the bracket by friction, maintaining the mirror in position relative to the LCDs.

The arms 15 and 17 are rotatably secured to the bottom of the U of the bracket, adjacent the edge of the mirror or its holder, by a rivet 33.

Thus the bracket 29 holds the mirror or its support, if used, along its edge. As the display is opened or closed, the bracket slides along the edge of the mirror or its support while the arms 15 and 17 rotate relative thereto and keep the mirror at the correct angle for aligning the images displayed on the two panels.

It will be understood that while the invention has been described with respect to LCD displays, other kinds of displays could be used. For example, if the folding structure is used, other flat panel forms of displays other than LCD may be used, such as flat plasma displays, flat cathode ray tubes, projection displays, etc. Indeed, the invention may be useful using displays which are not flat.

To achieve the mutually 90° polarized displays, horizontally and vertically polarizing filters may be used in front of each display, or on the opposite faces of the mirror. Alternatively the display technology can have the polarizing filters built in or inherent in the display, as may be found in many LCD displays. Some monochrome LCD displays use polarizing filters, but the polarization is typically oriented in the same direction. To use such LCD displays, the polarizing filter of one of the two LCD displays used should be oriented orthogonal to the other.

With the structure described above, a monochrome or color portable or desktop computer may display stereoscopic images. Such images are particularly useful to architects or other persons wishing to view images created using CAD computer software.

A person understanding this invention may now conceive of alternative structures and embodiments or variations of the above. All of those which fall within the scope of the claims appended hereto are considered to be part of the present invention.

I claim:

1. A stereoscopic display comprising:
   (a) a pair of display means having faces mutually oriented between approximately 90° and 120° to each other,
   (b) means for polarizing light from images displayed on the respective display means, light from one image being polarized orthogonally to the light from the other image,
   (c) a semitransparent mirror disposed between and approximately bisecting the angle between the pair of display means for transmitting light from an image displayed on one display means and reflecting light from an image displayed on the other display means, toward a viewing position,
   (d) each of the display means displaying images oriented in mirror image orientation to the other with respect to said mirror,
   (e) each of the display means being comprised of a liquid crystal display (LCD),
   (f) each LCD being comprised of a polarizing filter, the polarizing filters having polarization directions 90° to each other,
   (g) one edge of each of the LCDs being hinged to the other and to one edge of said mirror,
   (h) and further including two pair of mirror alignment arms which are equal in length, each pair slidingly hinged between an edge of the mirror and respective fixed positions at corresponding edges of the LCD, whereby the LCDs may be rotated about the hinge connecting them together from a mutually facing closed position to an open position between 90° and 120° apart while the arms maintain said mirror in a position bisecting the angle between the LCDs.

2. A display as defined in claim 1 in which said LCDs are displays of and are controlled by a portable computer.

3. A display as defined in claim 2 in which the polarizing means is comprised of polarizing filters disposed over respective faces of the pair of display means, the polarizing direction of the filters being 90° to each other.

4. A display as defined in claim 1 in which each pair of mirror alignment arms is rotatably connected to a bracket, each bracket holding said mirror along one edge thereof.

5. A display as defined in claim 4 including means for allowing each bracket to slide along a corresponding edge of the mirror while retaining the arms adjacent the mirror.

6. A display as defined in claim 5 in which the mirror or a mirror support retaining the mirror contains elongated channels on opposite faces thereof along edges thereof which are adjacent said arms, and in which each bracket is U-shaped and extends around an edge of the mirror or mirror support, ends of the bracket being turned into and retained by the said elongated channels, whereby the bracket may slide in the channels while retaining the arms connected thereto adjacent the edge of the mirror or its support.

* * * * *